United States Patent
Qiao et al.

(10) Patent No.: US 10,730,490 B2
(45) Date of Patent: Aug. 4, 2020

(54) METHOD OF DETECTING AND CORRECTING THE FAILURE OF AUTOMATIC BRAKING SYSTEM

(71) Applicant: Continental Automotive Systems, Inc., Auburn Hills, MI (US)

(72) Inventors: Ningsheng Qiao, Troy, MI (US); Ali Houry, Dearborn, MI (US); Jeremy W Tuggle, Shelby Township, MI (US); Brandon Herzog, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 85 days.

(21) Appl. No.: 16/131,000

(22) Filed: Sep. 13, 2018

(65) Prior Publication Data

US 2019/0084532 A1 Mar. 21, 2019

Related U.S. Application Data

(60) Provisional application No. 62/560,711, filed on Sep. 20, 2017.

(51) Int. Cl.
*B60T 7/22* (2006.01)
*B60T 8/172* (2006.01)
(Continued)

(52) U.S. Cl.
CPC ....... *B60T 7/22* (2013.01); *B60T 8/17* (2013.01); *B60T 8/171* (2013.01); *B60T 8/172* (2013.01);
(Continued)

(58) Field of Classification Search
None
See application file for complete search history.

(56) References Cited

U.S. PATENT DOCUMENTS

| 5,955,945 A | 9/1999 | Fuhrer |
| 6,278,360 B1 * | 8/2001 | Yanagi .............. B60Q 1/525 340/436 |

(Continued)

FOREIGN PATENT DOCUMENTS

| DE | 102013001228 A1 | 7/2014 |
| DE | 102011080789 | 12/2015 |
| DE | 102014224019 A1 | 5/2016 |

OTHER PUBLICATIONS

The International Search Report and the Written Opinion of the International Searching Authority dated Nov. 28, 2018 for corresponding PCT application No. PCT/US2018/051263.

Primary Examiner — Jonathan M Dager
Assistant Examiner — Garrett F Evans

(57) ABSTRACT

A failure detection and correction function which is able to detect a failure of an automatic braking system, and provide a corrected action. The failure detection and correction function is independent of the automatic braking function. The failure detection and correction function uses object coordinates and the speed of the vehicle to determine the collision risk, and then calculates a desired deceleration if there is imminent collision. The function uses desired deceleration to compare to a deceleration request from automatic braking function to determine if there is a failure. The failure detection and correction function takes corrected action to avoid the collision if the automatic braking function has failed.

10 Claims, 3 Drawing Sheets

(51) Int. Cl.
*B60T 8/17* (2006.01)
*B60T 8/171* (2006.01)
*B60T 8/1755* (2006.01)

(52) U.S. Cl.
CPC ..... *B60T 8/17558* (2013.01); *B60T 2201/022* (2013.01); *B60T 2230/02* (2013.01); *B60T 2240/00* (2013.01); *B60T 2250/00* (2013.01); *B60T 2250/03* (2013.01); *B60T 2250/04* (2013.01); *B60T 2270/402* (2013.01)

(56) References Cited

U.S. PATENT DOCUMENTS

| | | |
|---|---|---|
| 6,842,684 B1 | 1/2005 | Kade et al. |
| 2007/0278856 A1 | 12/2007 | Craig et al. |
| 2012/0290146 A1* | 11/2012 | Dedes ................ G01C 21/3697 701/1 |
| 2013/0110370 A1* | 5/2013 | Inomata ................... B60T 7/22 701/70 |
| 2014/0288785 A1 | 9/2014 | Bretzigheimer et al. |
| 2015/0100190 A1 | 4/2015 | Yopp |
| 2015/0353062 A1 | 12/2015 | Breuer et al. |

\* cited by examiner

METHOD OF DETECTING AND CORRECTING THE FAILURE OF AUTOMATIC BRAKING SYSTEM

CROSS-REFERENCE TO RELATED APPLICATIONS

This application claims the benefit of U.S. Provisional Application No. 62/560,711 filed Sep. 20, 2017. The disclosures of the above applications are incorporated herein by reference.

FIELD OF THE INVENTION

The invention relates generally to an automatic braking system for a vehicle, which includes a failure detection and correction function, which is operable for detecting a failure in the automatic braking function of the automatic braking system.

BACKGROUND OF THE INVENTION

Automated braking functions which are part of an autonomous driving vehicle, or a vehicle having an autonomous driving function, use sensors such as radar, laser, or cameras to detect objects that could cause potential collisions. These objects could be other vehicles, pedestrians or other objects. These braking functions apply braking to avoid an imminent collision with any of these objects without any driver input. Automatic braking is designed to function as a backup co-pilot that is always paying attention to road objects and braking on these collision-potential objects, even if the driver is not. It doesn't take away the responsibility of the driver the use the brakes to avoid collisions or slow the vehicle down, but it can support the driver to intervene in situations where the driver is distracted or fails to react quickly enough when traffic suddenly slows or stops, or an obstacle appears too quickly on the road ahead. Distracted driving is an issue for many drivers, which is not an issue for an automated braking function, but rather the automated braking function is constantly monitoring the road ahead and providing adequate braking at the desired time and with the sufficient magnitude of force.

Automated braking functions cannot achieve a 100% braking robustness and effectiveness. There are times where faults in the system function may occur which causes a risk leading to a safety hazard. The most safety-critical faults are those that lead to the inability or not decelerate sufficiently or even do not decelerate at all, increasing the risk of colliding with one or more objects.

Accordingly, there exists a need for a braking system which is able to detect when there are faults in the braking system, and still provide sufficient braking functionality.

SUMMARY OF THE INVENTION

The present invention is a failure detection and correction function which is able to detect a failure of an automatic braking system, and provide a corrected action.

The failure detection and correction function is independent of the automatic braking function. The failure detection and correction function uses object coordinates and the speed of the vehicle to determine the collision risk, and then calculates a desired deceleration if there is imminent collision. The function uses desired deceleration to compare to a deceleration request from automatic braking function to determine if there is a failure. The failure detection and correction function takes corrected action to avoid the collision if the automatic braking function has failed.

In one embodiment, the present invention is an automatic braking system for a vehicle having a failure detection and correction function, the automatic braking system including one or more braking units, a brake actuator module operable for controlling the one or more braking units, and an object detection function in electrical communication with the brake actuator module. The object detection function detects at least one object in proximity to the vehicle. The automatic braking system also includes an automatic braking function in electrical communication with the brake actuator module, where the automatic braking function generates a deceleration request to determine a collision risk with the object based on the position of the vehicle and the vehicle trajectory.

The automatic braking system also includes a failure detection and correction function which part of the brake actuator module. The failure detection and correction function calculates a desired deceleration. The failure detection and correction function compares the desired deceleration to the deceleration request, and the vehicle is decelerated depending upon which of the desired deceleration or the deceleration request results in the vehicle stopping within the shortest distance.

In an embodiment, the system uses the deceleration request to decelerate the vehicle when the deceleration request is greater than or equal to the desired deceleration.

In an embodiment, the position of the vehicle is based on a combination of roll angle, pitch angle, and yaw angle.

In an embodiment, the automatic braking system includes a vehicle data provider in electrical communication with the brake actuator module and the automatic braking function. The vehicle data provider detects one or more operating parameters of the vehicle, where the vehicle operating parameters include, but are not limited to, pitch angle, roll angle, yaw angle, yaw displacement, yaw rate, speed, acceleration, wheel speed, and front wheel angle.

In an embodiment, the automatic braking system also includes a desired stopping distance, which is determined based on information received from the vehicle data provider.

In an embodiment, an x-position represents a first coordinate corresponding to a first relative distance between the at least one object and the vehicle, a y-position represents a second coordinate corresponding to a second relative distance between the object and the vehicle, and a second calculated distance is the combined length of the x-position and one-half the length of the vehicle. The desired deceleration is calculated if the second calculated distance is less than or equal to the desired stopping distance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
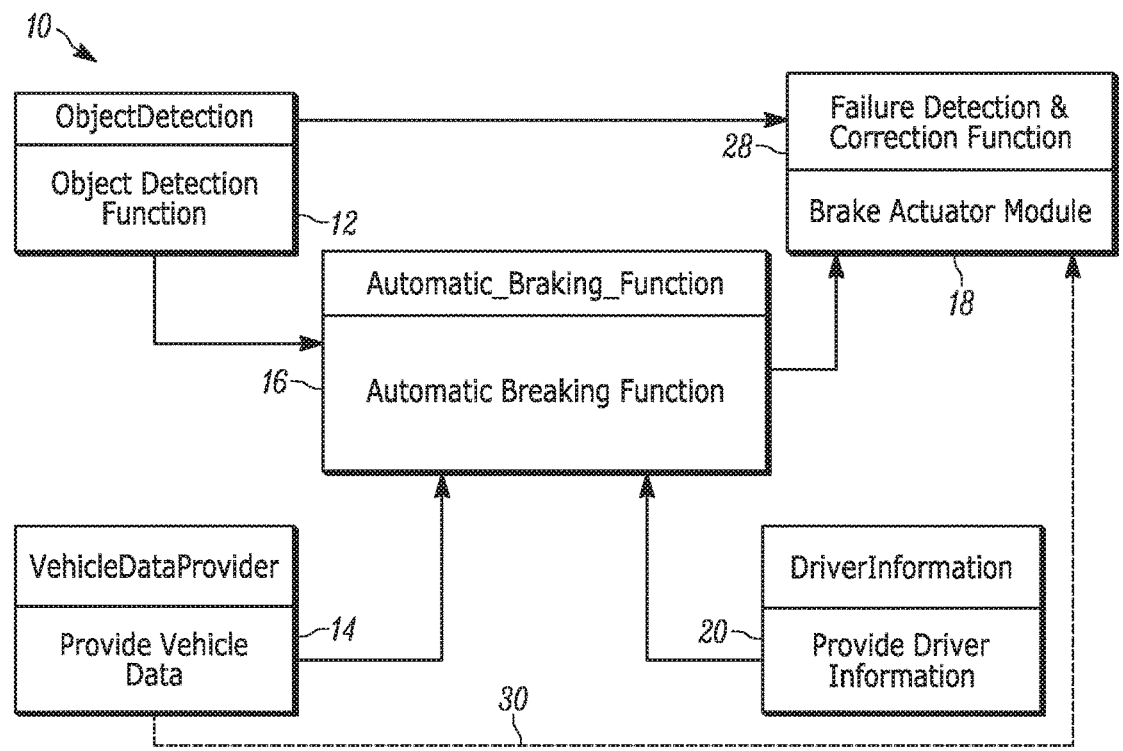
FIG. 1 is a diagram of an automatic braking system for a vehicle, according to embodiments of the present invention.

A diagram of an automatic braking system for a vehicle according to the present invention is shown in FIG. 1 generally at 10. Referring to the Figures generally, the automatic braking system 10 may be used as part of a vehicle 10A which is fully autonomous, and never to be driven by a driver, or the automatic braking system 10 of the present invention may be used with a vehicle that may be driven by a driver, and have an autonomous driving mode. The automatic braking system 10 includes of an object detection function 12, a vehicle data provider 14, an automatic braking function 16, a brake actuator module 18 for controlling one or more braking units of the vehicle 10A, and a driver information provider 20. The automatic braking function 16 is part of a module or controller. The automatic braking function 16 determines a collision risk based in information received from the object detection function 12 and the vehicle data provider 14. The automatic braking function 16 then sends a deceleration request to the brake actuator module 18 if there is an imminent collision. The brake actuator module 18 resides in the controller of the electronic brake system module (not shown).

Figure 2:
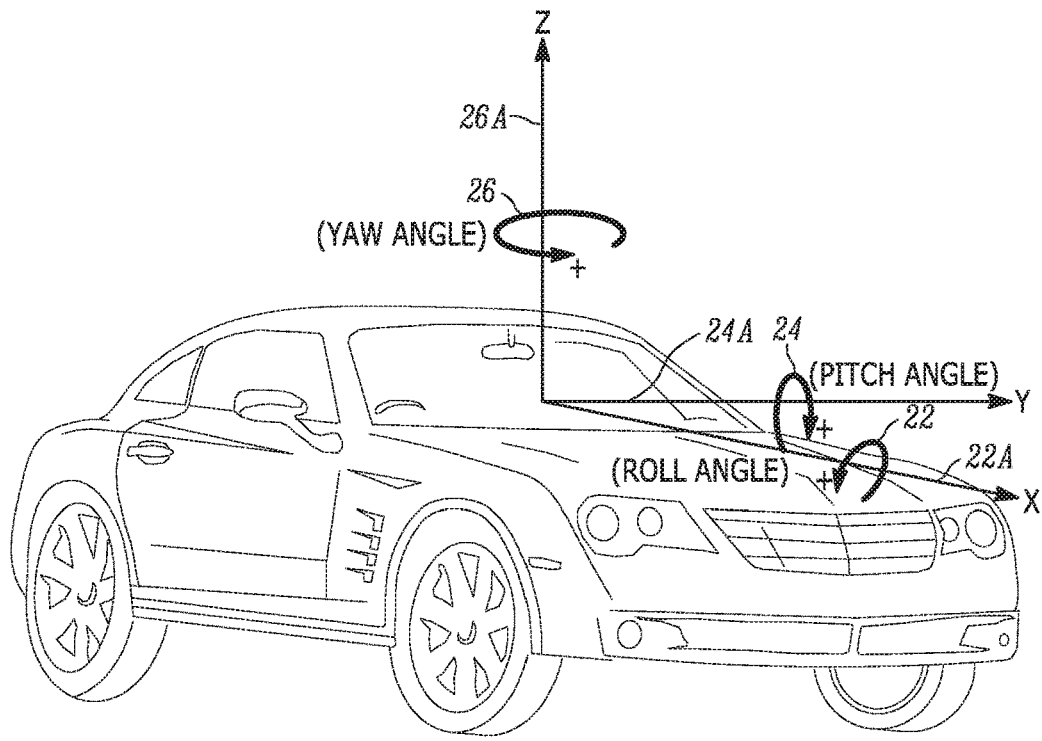
FIG. 2 is a perspective view of a vehicle having an automatic braking system, according to embodiments of the present invention.

The object detection function 12 uses sensors, laser, cameras, LIDAR (Light Imaging, Detection, and Ranging), LADAR (Laser Imaging, Detection, and Ranging), other types of radar, ultrasound, sonar, a global positioning system (GPS), or any other type of suitable sensing device, to detect potential collisions between the vehicle 10A and other vehicles, pedestrians or hazards. Referring to FIG. 2, vehicle data provider 14 is also able to provide the coordinates of the vehicle 10A. The coordinates may include, but are not limited to, pitch angle, roll angle, yaw angle, yaw displacement, and yaw rate. In addition to the coordinates of the vehicle 10A, the vehicle data provider 14 may also provide other operational parameters, including, but not limited to, speed, acceleration, wheel speed, and front wheel angle.

For instance, the vehicle data provider 14 is able to provide roll angle 22 of the vehicle 10A, which is the angle of the vehicle 10A about the longitudinal axis 22A (position x). The vehicle data provider 14 is also able to provide the pitch angle 24 of the vehicle 10A, which is the angle of the vehicle 10A about the lateral axis 24A (position y). Furthermore, the vehicle data provider 14 is also able to provide the yaw angle 26 of the vehicle 10A, which is the position of the vehicle 10A about the yaw axis 26A (position z). The roll angle 22, pitch angle 24, and yaw angle 26, are in accord with ISO vehicle coordinate definition, as shown FIG. 2.

The driver information provider 20 is able to provide information regarding any input from the driver of the vehicle 10A, such as throttle position, or the amount of brake force applied. The driver information provider 20 provides this information when the vehicle 10A is being driven in manual mode, or when the driver of the vehicle 10A decides to override the autonomous driving function.

In operation, either when the vehicle 10A is a fully autonomous vehicle, or is operating in an autonomous driving mode, the object detection function 12 is able to determine the location and relative speed of at least one object, or many different objects around the vehicle 10A, and this information is sent to the automatic braking function 16. The information received from the object detection function 12 is used to determine if deceleration of the vehicle 10A is necessary. If the location of an object does not directly intersect the vehicle trajectory, there still may be a need to decelerate the vehicle 10A to reduce the risk of collision with an object that may be in close proximity to the vehicle trajectory. The automatic braking function 16 also receives information from the vehicle data provider 14 regarding the angles 22, 24, 26 of the vehicle 10A, the vehicle trajectory of the vehicle 10A, and the other operational parameters listed above. If deceleration of the vehicle 10A is necessary, the automatic braking function 16 then sends a signal to the brake actuator module 18 corresponding to a deceleration request based on the information received from the object detection function 12 and the vehicle data provider 14. The brake actuator module 18 actuates the brakes of the vehicle 10A based on the signal received from the brake actuator module 18, and the vehicle 10A stops within a requested stopping distance 54. The requested stopping distance 54 therefore corresponds to the deceleration request.

Figure 4:
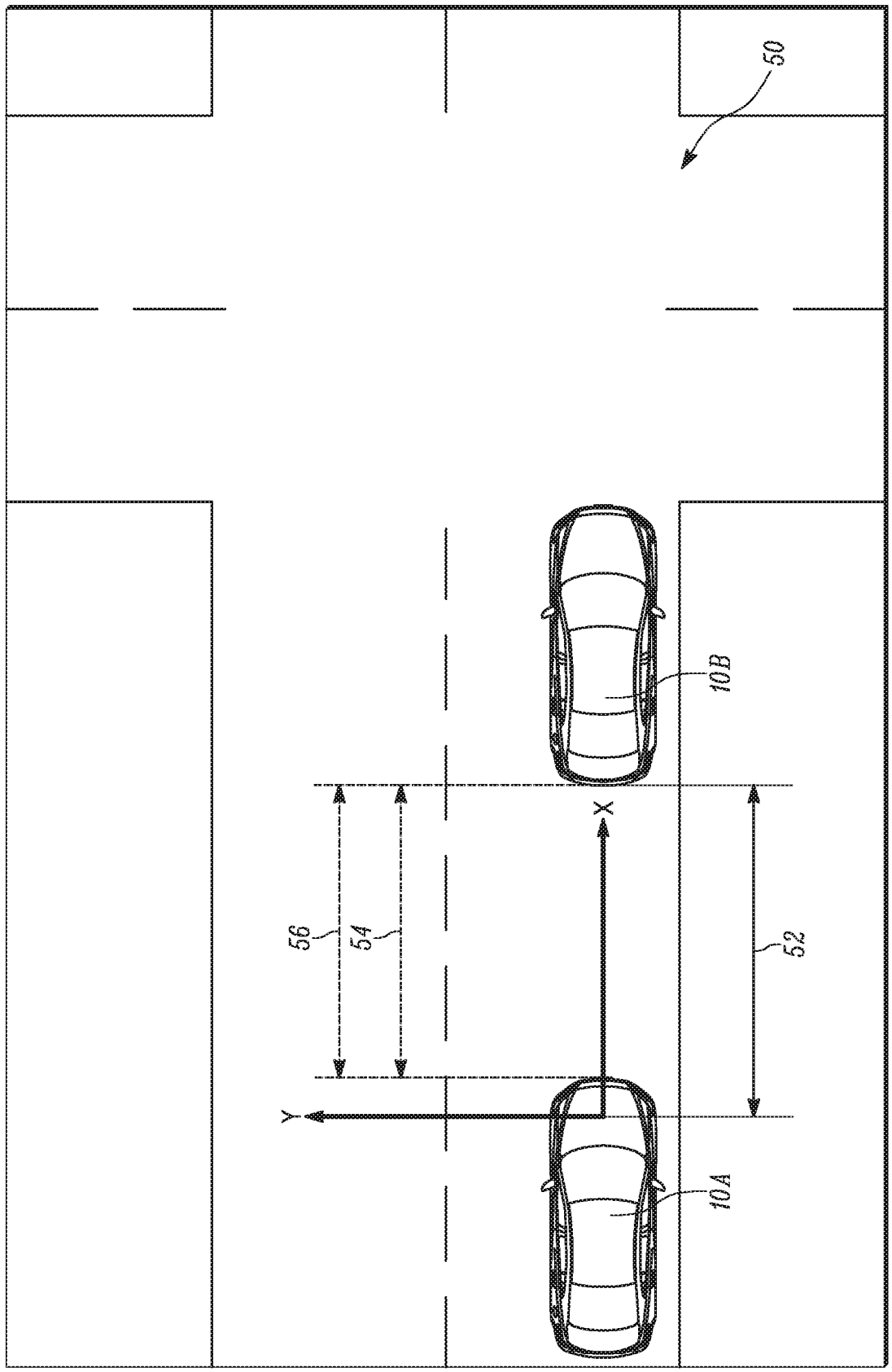
FIG. 4 is a diagram of a vehicle approaching an intersection, where the vehicle includes an automatic braking system for a vehicle, according to embodiments of the present invention.

An example of this is shown in FIG. 4. The vehicle 10A is approaching an intersection, shown generally at 50, where a second vehicle 10B is stopped. The second vehicle 10B has an x-position and y-position relative to the vehicle 10A, which are detected by the object detection function 12, where the x-position and y-position are based on the same coordinate system as the roll angle 22, pitch angle 24, and the yaw angle 26. In the example shown in FIG. 4, the x-position is shown by the distance 52, and the y-position in this example has a measurement of zero, because the second vehicle 10B is in front the vehicle 10A (and is not offset to the left or to the right of the vehicle 10A). In the example shown in FIG. 4, the vehicle trajectory of the vehicle 10A is substantially straight, but the vehicle trajectory of the vehicle 10A could be different if the vehicle 10A were performing some other type of autonomous driving maneuver, such as a passing maneuver, or navigating a curve.

If the position of one or more objects, such as the vehicle 10B detected by the object detection function 12 would result in a collision if the vehicle 10A were to continue on the current vehicle trajectory, the automatic braking function 16 sends a signal representing the deceleration request to the brake actuator module 18, and the brake actuator module 18 receives the deceleration request, and executes the deceleration request (i.e., actuates one or more braking units to decelerate the vehicle 10A) in order to avoid a collision. If there is a failure in the automatic braking function 16, a collision occurs when an object, such as the vehicle 10B, is at a location which intersects with the vehicle trajectory.

The automatic braking system 10 of the present invention also includes a failure detection and correction function 28, which resides in the brake actuator module 18. The failure detection and correction function 28 is used to provide a braking function in case there is a failure in the automatic braking function 16. There is also an internal link 30 between the vehicle data provider 14 and the brake actuator module 18. The object detection function 12 also sends position coordinates for the x-position and y-position for various objects, such as the second vehicle 10B, to the failure detection and correction function 28. The failure detection and correction function 28 calculates a desired stopping distance 56 (for the vehicle 10A). The failure detection and correction function 28 also calculates a second calculated distance, where the second calculated distance is the total distance of the x-position of the object (relative to the vehicle 10A) combined with half of the length of the vehicle 10A.

The failure detection and correction function 28 then makes a determination if the second calculated distance is less than the desired stopping distance 56. If the second calculated distance is less than the desired stopping distance 56, deceleration of the vehicle 10A is therefore necessary. Once it is determined that deceleration of the vehicle 10A is necessary, the failure detection and correction function 28 then generates a desired deceleration, which is sent to the brake actuator module 18. The desired deceleration corresponds to the desired stopping distance 56. The brake actuator module 18 includes an algorithm which compares the deceleration request (received from the automatic braking function 16) with the desired deceleration (generated by the failure detection and correction function 28), and the brake actuator module 18 actuates one or more of the braking units to decelerate the vehicle 10A based on which of the deceleration request or the desired deceleration results in the vehicle 10A stopping within the shortest distance. If the automatic braking function 16 is functioning properly, the requested stopping distance 54 (corresponding to the deceleration request from the automatic braking function 16) and the desired stopping distance 56 (generated by the failure detection and correction function 28) should be similar. If there is a difference in stopping distance between the deceleration request and the desired deceleration (which may be the result of a failure in the automatic braking function 16), the deceleration corresponding to the shorter stopping distance is used to decelerate the vehicle 10A.

Figure 3:
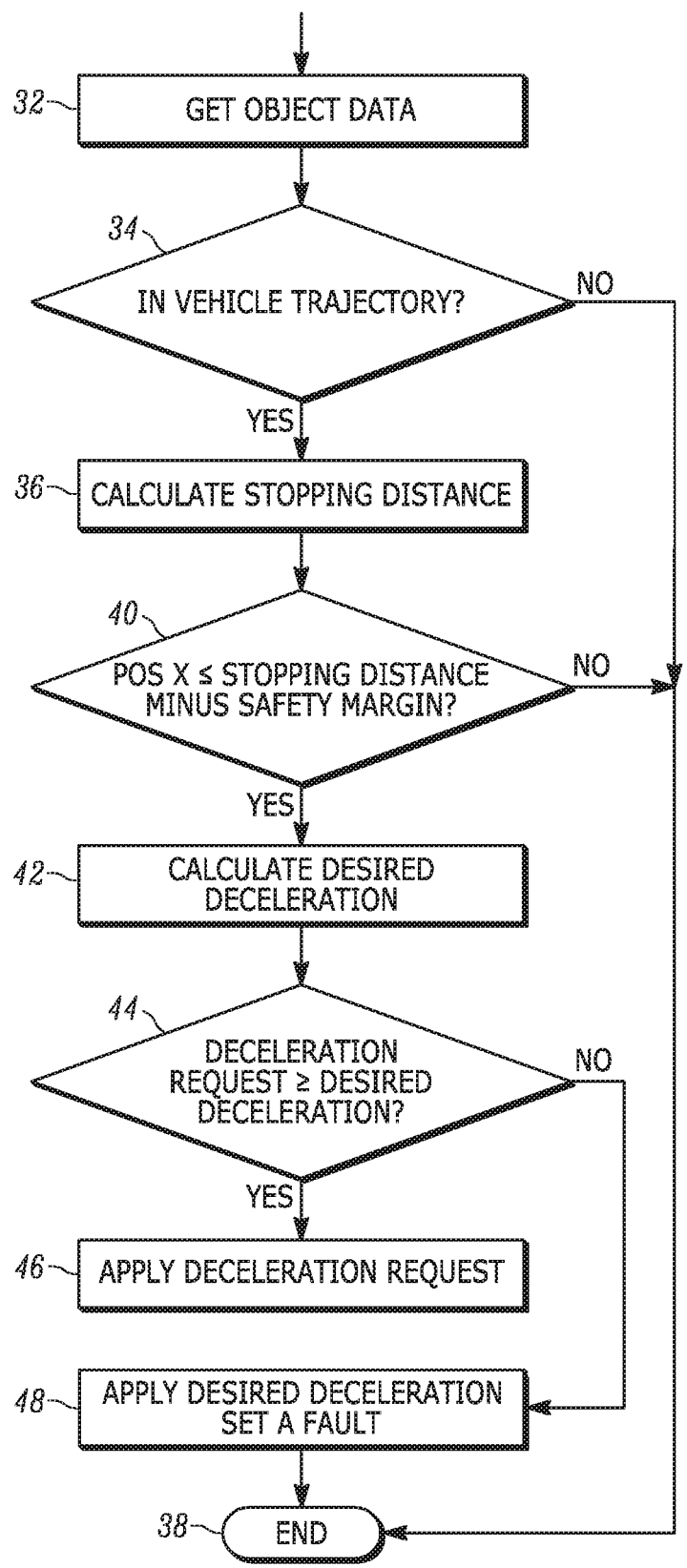
FIG. 3 is a flow chart of the steps for operating an automatic braking system for a vehicle, according to embodiments of the present invention.

FIG. 3 shows a functional flowchart of the operation of the failure detection and correction function 28. The Get Object Data step 32 involves obtaining the x-position and y-position coordinates of an object (such as the vehicle 10B) that is in proximity to the vehicle 10A. At step 34, a determination is made as to whether the absolute value of distance of the y-position (of the object) multiplied by two is less than or equal to the width of the vehicle 10A. The purpose of step 34 is to determine if an object (such as the vehicle 10B) is in a location (either intersecting, or in close proximity to, the vehicle trajectory) such that deceleration of the vehicle 10A is necessary. If the absolute value of the y-position of the object multiplied by two is less than or equal to the width of the vehicle 10A, the function 28 calculates the desired stopping distance 56 at step 36 (the requested stopping distance 54 is provided by the brake actuator module 18 based on information received from the automatic braking function 16), if not, the program ends at step 38 because no deceleration is necessary.

The vehicle stopping distance calculation (at step 36) uses the equation for desired stopping distance 56 calculation:

$$\text{Desired stopping distance} = V^2/(2\ \mu g)$$

Where:

V is the velocity of the vehicle 10A;

$\mu$ is a nominal value for the coefficient of static friction between good tires and a good road surface. For many existing tires, the coefficient of kinetic friction on a dry road surface may approach 0.8 if the braking is not so prolonged as to cause tire melting; and g is the acceleration due to gravity. The typical value for the acceleration due to gravity is 9.8 m/s$^2$.

Once the desired stopping distance 56 is calculated at step 36, another calculation is made to determine the second calculated distance, also referred to as Pos X, where:

$$\text{Pos X} = \text{x-position of the object} + (\text{vehicle length}*0.5)$$

In the example shown in FIG. 3, the x-position is the distance 52 between the vehicles 10A,10B, and Pos X is the total combined length of the distance 52 and half of the length of the vehicle 10A.

At step 40, a determination is made as to whether Pos X is less than or equal to the desired stopping distance 56 (minus a safety margin). If Pos X is less than or equal to the desired stopping distance 56, the desired deceleration is calculated at step 42, otherwise there is no action to be taken, and the program ends at step 38.

The Desired deceleration calculation is:

$$\text{Desired deceleration} = (V^2 - U^2)/2S$$

Where:

V is final vehicle speed (it is 0 at this case);

U is initial vehicle speed; and

S is the (stopping distance minus a safety margin).

After calculating desired deceleration at step 42, the failure detection and correction function 28 obtains the requested deceleration (based on the deceleration request) from the automatic braking function 16. At step 44, a comparison is made between the desired deceleration (which is calculated by the failure detection and correction function 28) and the requested deceleration received from the automatic braking function 16. If the requested deceleration from the automatic braking function 16 is greater than or equal to the desired deceleration, at step 46 the system 10 applies the deceleration request to decelerate the vehicle 10A. Otherwise, it is indicated that there is a failure in the automatic braking function 16, and the system 10 applies the calculated desired deceleration at step 48.

The failure detection and correction function 28 is executed every 20 milliseconds, and is independent of the automatic braking function 16. The frequency of the execution of the failure detection and correction function 28 ensures that there is a fault in the automatic braking function 16 is detected as soon as possible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automatic braking system for a vehicle, comprising:
one or more braking units;
a brake actuator module operable for controlling the one or more braking units;
an object detection function in electrical communication with the brake actuator module, the object detection function for detecting at least one object in proximity to the vehicle;
an automatic braking function in electrical communication with the brake actuator module, the automatic braking function for generating a deceleration request to determine a collision risk with the at least one object based on a position of the vehicle and vehicle trajectory;

a failure detection and correction function for calculating a desired deceleration, the failure detection and correction function being part of the brake actuator module;

wherein the failure detection and correction function compares the desired deceleration to the deceleration request, and the vehicle is decelerated depending upon which of the desired deceleration or the deceleration request results in the vehicle stopping within the shortest distance;

a vehicle data provider in electrical communication with the brake actuator module and the automatic braking function, wherein the vehicle data provider detects one or more operating parameters of the vehicle;

a desired stopping distance;

wherein the desired stopping distance is determined based on information received from the vehicle data provider;

an x-position representing a first coordinate corresponding to a first relative distance between the at least one object and the vehicle;

a y-position representing a second coordinate corresponding to a second relative distance between the at least one object and the vehicle;

a second calculated distance; and wherein the second calculated distance is the combined length of the x-position and one-half the length of the vehicle.

2. The automatic braking system for a vehicle of claim 1, wherein the system uses the deceleration request to decelerate the vehicle when the deceleration request is greater than or equal to the desired deceleration.

3. The automatic braking system for a vehicle of claim 1, wherein the position of the vehicle is based on a combination of roll angle, pitch angle, and yaw angle.

4. The automatic braking system for a vehicle of claim 1, wherein the desired deceleration is calculated if the second calculated distance is less than or equal to the desired stopping distance.

5. The automatic braking system for a vehicle of claim 4, the one or more operating parameters further comprising at least one of pitch angle, roll angle, yaw angle, yaw displacement, yaw rate, speed, acceleration, wheel speed, and front wheel angle.

6. A method for detecting a failure in an automatic braking system for a vehicle, comprising:
providing a brake actuator module;
providing an object detection function in electrical communication with the brake actuator module;
providing an automatic braking function, the brake actuator module having the automatic braking function;
providing a failure detection and correction function being part of the brake actuator module;
detecting at least one object located in proximity to the vehicle using the object detection function;
determining if the at least one object intersects with a vehicle trajectory;
generating a deceleration request for a collision risk with the at least one object based on a position of the vehicle and the vehicle trajectory, the deceleration request being generated by the automatic braking function;
calculating a desired deceleration, which is calculated by the failure detection and correction function;
determining if the desired deceleration and the deceleration request are substantially equal;
decelerating the vehicle based on which of the desired deceleration or the requested deceleration results in the vehicle stopping within the shortest distance;
providing a vehicle data provider;
providing a desired stopping distance;
determining the desired stopping distance based on information received from the vehicle data provider;
providing an x-position representing a first coordinate corresponding to a first relative distance between the at least one object and the vehicle;
providing a y-position representing a second coordinate corresponding to a second relative distance between the at least one object and the vehicle;
providing a second calculated distance; and
determining the second calculated distance by combining the length of the x-position and one-half the length of the vehicle.

7. The method of claim 6, further comprising the steps of:
determining whether the second calculated distance is less than or equal to the desired stopping distance;
calculating the desired deceleration if the second calculated distance is less than or equal to the desired stopping distance.

8. The method of claim 7, further comprising the steps of detecting one or more operating parameters of the vehicle using the vehicle data provider.

9. The method of claim 8, further comprising the steps of providing the one or more operating parameters to be at least one of pitch angle, roll angle, yaw angle, yaw displacement, yaw rate, speed, acceleration, wheel speed, and front wheel angle.

10. The method of claim 6, further comprising the steps of providing the vehicle data provider to be in electrical communication with the automatic braking function and the brake actuator module.

* * * * *